(12) United States Patent
Piriou et al.

(10) Patent No.: US 12,041,473 B2
(45) Date of Patent: Jul. 16, 2024

(54) METHOD FOR PREDICTING A SIGNAL AND/OR SERVICE QUALITY AND ASSOCIATED DEVICE

(71) Applicant: Continental Automotive GmbH, Hannover (DE)

(72) Inventors: Simon Piriou, Plaisance-du-Touch (FR); Grégory Vial, Auragne (FR)

(73) Assignee: Continental Automotive GmbH, Hannover (DE)

( * ) Notice: Subject to any disclaimer, the term of this patent is extended or adjusted under 35 U.S.C. 154(b) by 464 days.

(21) Appl. No.: 17/603,825

(22) PCT Filed: Apr. 6, 2020

(86) PCT No.: PCT/EP2020/059719
§ 371 (c)(1),
(2) Date: Oct. 14, 2021

(87) PCT Pub. No.: WO2020/212176
PCT Pub. Date: Oct. 22, 2020

(65) Prior Publication Data
US 2022/0217557 A1 Jul. 7, 2022

(30) Foreign Application Priority Data
Apr. 15, 2019 (FR) ...................................... 1903992

(51) Int. Cl.
*H04W 24/08* (2009.01)
*H04L 41/147* (2022.01)
(Continued)

(52) U.S. Cl.
CPC ........... *H04W 24/08* (2013.01); *H04L 41/147* (2013.01); *H04W 4/023* (2013.01); *H04W 76/10* (2018.02)

(58) Field of Classification Search
CPC ..... H04W 24/08; H04W 4/023; H04W 76/10; H04L 41/147; H04L 41/5067; H04L 43/08
See application file for complete search history.

(56) References Cited

U.S. PATENT DOCUMENTS 6,122,607 A * 9/2000 Ekudden ............... G10L 19/005
704/212
9,900,790 B1 2/2018 Sheen et al.
(Continued)

FOREIGN PATENT DOCUMENTS

CN 107332704 A 11/2017
CN 109347668 A 2/2019
(Continued)

OTHER PUBLICATIONS

Search Report dated Jan. 22, 2020 from corresponding French Patent Application No. 1903992.
(Continued)

*Primary Examiner* — Raj Jain

(57) ABSTRACT

A method for predicting at least one parameter representative of a signal quality and/or service quality liable to be delivered to a device when it is connected to one radiofrequency antenna among a plurality of antennas that are configured to establish a connection with said device. The method includes: obtaining at least one parameter of decrease in the signal and/or service quality, predicting at least one parameter representative of a signal and/or service quality by applying at least one prediction model configured to predict at least one parameter representative of a signal quality and/or service quality, on the basis of an estimated parameter of decrease in the signal and/or service quality, and of an indication of a moment and of a position of the device for which the prediction must be carried out, the (Continued)

prediction model having been trained beforehand via supervised learning on a training database.

10 Claims, 2 Drawing Sheets

(51) Int. Cl.
*H04W 4/02* (2018.01)
*H04W 76/10* (2018.01)

(56) References Cited

U.S. PATENT DOCUMENTS

| | | | | |
|---|---|---|---|---|
| 10,341,701 | B2* | 7/2019 | Hirsch | H04N 21/44016 |
| 2002/0181419 | A1* | 12/2002 | Zhang | H04L 41/147 370/352 |
| 2009/0245118 | A1 | 10/2009 | McCormick | |
| 2012/0238272 | A1* | 9/2012 | Hwang | H04W 36/245 455/436 |
| 2013/0148525 | A1* | 6/2013 | Cuadra Sanchez | H04L 41/5067 370/252 |
| 2014/0200038 | A1 | 7/2014 | Rao et al. | |
| 2017/0179592 | A1 | 6/2017 | Anderson | |
| 2020/0120458 | A1* | 4/2020 | Aldana | H04W 72/23 |
| 2021/0251503 | A1* | 8/2021 | Gurevich | A61B 5/7267 |
| 2022/0217557 | A1* | 7/2022 | Piriou | H04W 76/10 |

FOREIGN PATENT DOCUMENTS

| | | |
|---|---|---|
| EP | 2346283 A1 | 7/2011 |
| WO | 2018011742 A1 | 1/2018 |

OTHER PUBLICATIONS

International Search Report and Written Opinion dated Jul. 24, 2020 from corresponding International Patent Application No. PCT/EP2020/059719.

Office Action dated May 12, 2023 from corresponding Chinese Application No. 202080028805.0.

Zhu Ruohan "Research on Cell Selection and Access Control Methods in Radio Resource Management of Heterogeneous Networks", China Excellent Master's Thesis Full-text Database Information Technology Series, pp. 136-487, 2016.

Decision to Grant dated Jul. 31, 2023 from corresponding Chinese patent application No. 202080028805.0.

\* cited by examiner

[Fig. 1]
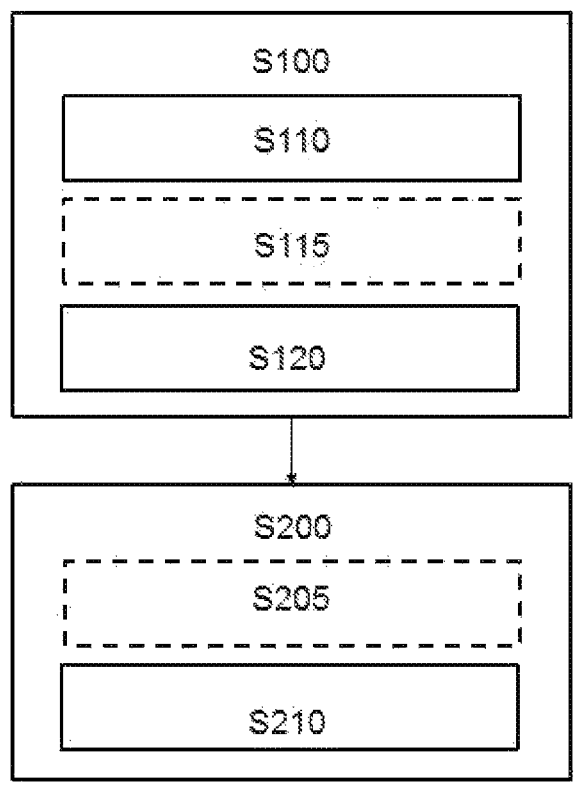
[Fig. 2]
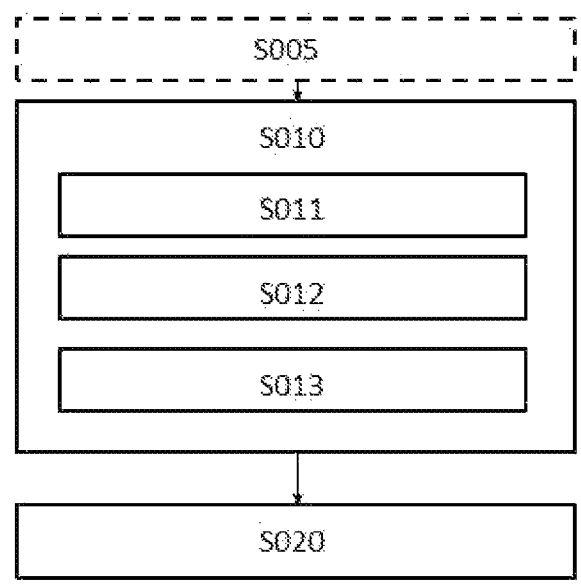

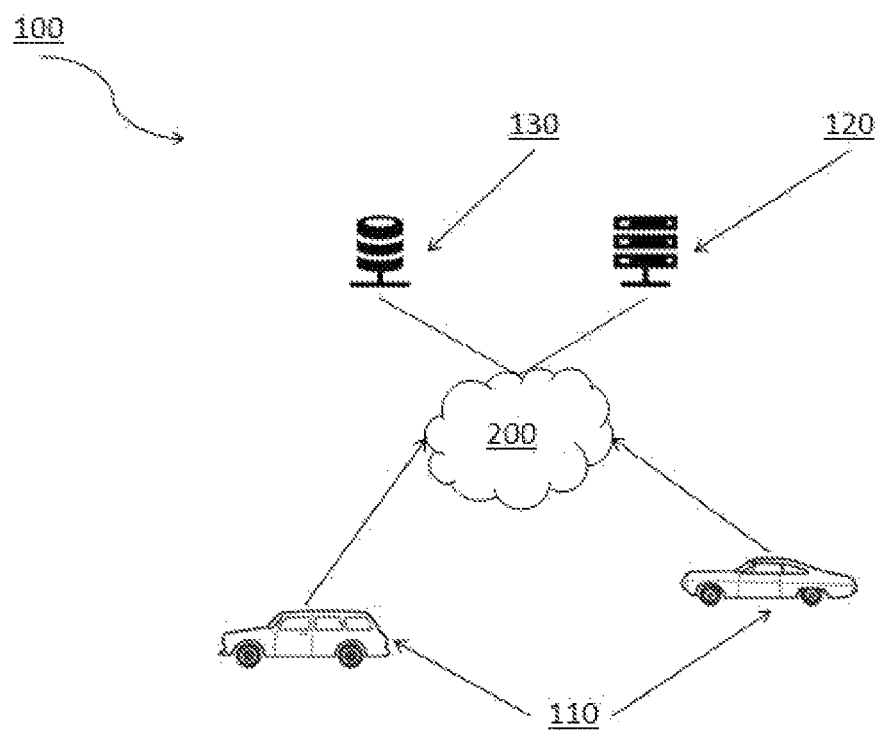
[Fig. 3]

METHOD FOR PREDICTING A SIGNAL AND/OR SERVICE QUALITY AND ASSOCIATED DEVICE

BACKGROUND

The invention relates to the prediction of a signal and/or service quality for a device liable to be connected to a radiofrequency antenna, at a given time and for a given position of the device.

There are currently maps to identify areas covered and areas not covered, known as white spots, by radiofrequency antennas. These maps are established following the reception, for a plurality of devices connected to a cell of the cellular telephone network or to a Wi-Fi antenna for example, of information that makes it possible to estimate the quality of the connection between the device and the antenna to which it is connected. Unfortunately, these maps are established on the basis of statistical processing of the data and do not make it possible to predict the signal quality or the service quality that will be obtained at a given time for a device at a given position.

The prediction of a service quality at a given time for a given position is of interest for various applications related, in particular, to the transfer of data via the Internet network in order to be able to plan the transmission of data.

One of these applications regards, for example, services for connected vehicles which send data to a remote server of "cloud" type by means of radiofrequency wireless communications, using a cellular telephone network, in order to perform remote computations and send various types of information back to the vehicle. Other applications relate to the prediction of a service quality that can be obtained, for example, on a Wi-Fi network in a busy situation, for example in airports, and to adapt data sharing and transmission strategies accordingly.

BRIEF SUMMARY

It is an object of the invention in particular to alleviate the drawbacks of the prior art described above.

In particular, one object of the invention is to provide a method for predicting a service or signal quality that can be obtained at a given time and for a given position of a device capable of connecting to a radiofrequency antenna.

Another object of the invention is to take account of the external factors that may affect service or signal quality such as weather conditions or saturation of the antenna.

Another object of the invention is to be able to predict a service quality and/or signal quality that can be obtained on a route of a vehicle on the road network.

According to a first aspect, what is proposed is a method for predicting at least one parameter representative of a signal quality and/or service quality liable to be delivered to a device when it is connected to one radiofrequency antenna among a plurality of antennas that are configured to establish a connection with said device, the method being implemented by a computer, the method comprising:
 a step of obtaining at least one parameter of decrease in the signal and/or service quality,
 a step of predicting at least one parameter representative of a signal and/or service quality by applying at least one prediction model configured to predict at least one parameter representative of a signal quality and/or service quality, on the basis of an estimated parameter of decrease in the signal and/or service quality, and of an indication of a moment and of a position of the device for which the prediction must be carried out, the prediction model having been trained beforehand via supervised learning on a training database, the training database comprising, for a plurality of devices:
 at least one parameter representative of a signal quality and/or of a service quality when the device is connected to a radiofrequency antenna,
 an indicator of the position of the device,
 an indicator of a moment of connection of the device to the antenna,
 at least one parameter of decrease in the signal and/or service quality.

In one embodiment, the parameter of decrease in signal and/or service quality is an indicator of a meteorological condition affecting the propagation of a radiofrequency signal through the air or a parameter representative of the number of devices connected to an antenna.

In one embodiment, the parameter representative of the number of devices connected to the antenna is a measured or predicted number of devices connected to the antenna or a number of devices present in the vicinity of the antenna and of the device.

In one embodiment, the prediction step comprises selecting at least one prediction model from among a plurality of prediction models, each prediction model having been trained beforehand via supervised learning using a training database comprising data relating to the devices that are connected to a respective antenna.

In one embodiment, the indicator of the position of the device is a relative position of the device in relation to a respective antenna, the selected prediction model corresponding to the prediction model trained using a training database comprising the relative position of the device in relation to the respective antenna. The relative position of the device may comprise an angle and a distance between the device and the respective antenna.

In one embodiment, the method further comprises the prior implementation of training at least one model for predicting at least one parameter representative of a service quality and/or signal quality liable to be delivered by a radiofrequency antenna, comprising:
 a step of establishing a training database comprising:
 a sub-step of receiving data collected by a plurality of devices, the collected data comprising, for each device:
 the measurement of at least one parameter representative of a signal quality and/or of a service quality when the device is connected to a radiofrequency antenna,
 the GNSS position of the device when the device is connected to the antenna,
 the date and time of connection to the antenna,
 a sub-step of estimating, for each device connected to an antenna at a given date and at a given time of connection, at least one parameter of decrease in the signal and/or service quality,
 a sub-step of creating at least one training database on the basis of at least some of the collected data and of at least some of the parameters of decrease in the signal and/or service quality associated therewith,
 a step of training at least one prediction model via supervised learning of at least one parameter representative of a signal quality and/or of a service quality, from a training database.

In one embodiment, the collected data further comprise an identifier of the antenna to which a device has been connected at a given date and time of connection, the step of establishing a training database comprises the creation of a plurality of training databases, each training database comprising data relating to the devices connected to a respective antenna having a respective identifier and parameters of decrease in the signal and/or service quality associated therewith, the training step comprises training a prediction model via supervised learning of at least one parameter representative of a signal quality and/or of a service quality on each training database of the plurality of training databases.

In one embodiment, each training database comprises a relative position of each device in relation to the respective antenna at the date and time of connection to the respective antenna.

In one embodiment, the relative position of the device in relation to the respective antenna comprises a distance and an angle between the device and the respective antenna.

Another subject of the invention is a method for predicting a signal and/or service quality that can be obtained on a predetermined route of a vehicle on a road network by one radiofrequency antenna among a plurality of antennas that are configured to establish a connection with said device, the method being implemented by a computer, the method comprising:

estimating a time and date at which the vehicle should reach a predetermined position on the route—predicting at least one parameter representative of a signal and/or service quality by implementing a prediction method according to the preceding description at the determined time and date, at the predetermined position on the route.

Throughout the rest of the application, the expression "at least one parameter representative of a signal quality and/or of a service quality" refers to at least one service quality parameter, to at least one signal quality parameter or to at least one parameter representing a combination of service quality and/or signal quality parameters.

Using these one or more parameters, it is possible, depending on the case, to determine a signal quality, a service quality and/or a connection quality taking account of a number of service quality parameters and therefore a quality of user experience.

Advantageously, the prediction of a service quality that can be obtained on a predetermined route of a vehicle on a road network makes it possible to plan the transmission of data for sections that have a good service quality. Alternatively, this prediction may make it possible to choose a particular route from among a number of possible routes in order to maximize the service quality on the route taken.

Advantageously, the prediction of a signal quality that can be obtained on a predetermined route of a vehicle on a road network makes it possible to establish a route that makes it possible to avoid white spots.

According to another aspect, a computer program is proposed which comprises instructions for implementing a prediction method or a training method as defined herein when this program is executed by a computer.

According to another aspect, a computer is proposed which is configured to implement the method according to the preceding description.

BRIEF DESCRIPTION OF THE DRAWINGS

Other features, details and advantages of the invention will become apparent from reading the following detailed description and analyzing the appended drawings, in which:

FIG. 1 illustrates a method for predicting at least one parameter representative of a connection quality according to one embodiment of the invention;

FIG. 2 illustrates a method for training a prediction model configured to predict at least one parameter representative of a signal quality and of a service quality according to one embodiment of the invention;

FIG. 3 illustrates a system that makes it possible to train at least one prediction model via supervised learning of at least one parameter representative of a connection quality according to one embodiment of the invention.

DETAILED DESCRIPTION

The drawings and the following description contain mostly elements of a certain nature. They may therefore not only be used to improve understanding of the present invention but also contribute to the definition thereof, as applicable.

Reference is now made to FIG. 1.

FIG. 1 illustrates a method for predicting at least one parameter representative of a signal and/or service quality liable to be delivered at a given moment and for a given position of a device when the latter is connected to a radiofrequency antenna according to one embodiment of the invention.

In the context of the present application, it may be the prediction of one or more parameters representative of a signal quality and/or of a service quality. Regarding signal quality, it may be at least one parameter representative of a received power and other additional parameters such as a signal-to-noise ratio, a number of blocks allocated to the antenna, for example, or any other parameter that makes it possible to assess whether the signal strength will be sufficient to allow satisfactory data transfer. Regarding service quality, it may be at least one parameter representative of a bandwidth and other additional parameters such as a throughput, a latency rate, a packet loss rate, jitter or any other parameter that makes it possible to evaluate the speed and/or the response time associated with a data transfer between the device and the antenna. The parameter representative of a signal and/or of service quality may also be at least one parameter calculated from a combination of one or more parameters representative of a signal quality and/or of a service quality. For example, a number of parameters representative of service quality such as latency, packet loss rate, throughput and jitter may be used to determine a connection quality which then makes it possible to evaluate the quality of user experience.

It will be noted that the term "cell" is commonly used in the field of cellular telephony to describe a transmission/reception area of an antenna and that, when the radiofrequency antenna is an antenna of a cellular telephone network, the term cell may be used.

The prediction method comprises a step S100 of obtaining parameters in particular relating to the position and to the moment of prediction and a step S200 of predicting at least one parameter representative of a signal and/or service quality using at least one prediction model configured to predict at least one parameter representative of a signal quality and/or of a service quality.

Step S100 comprises a sub-step S110 of determining the moment and the position for which the prediction has to be made. This may involve retrieving, for example, the date, time and position in question from a memory of the computer implementing the steps of the prediction method. It may also involve estimating, on a predetermined route of a vehicle, the time and the date at which the vehicle should reach a predetermined position on its route. It is also possible, depending on the prediction model used, to determine whether it is the same day or a particular day of the week in an optional sub-step S115. Alternatively, this sub-step may be implemented during step S200 of predicting at least one parameter representative of a signal and/or service quality.

Step S100 comprises a sub-step S120 of estimating at least one parameter of decrease in the signal and/or service quality at a predetermined moment and at a predetermined position. The parameter of decrease in signal and/or service quality may be chosen from among an indicator of a meteorological condition affecting the propagation of a radiofrequency signal through the air, for example, and a parameter representative of a number of devices connected to an antenna. The parameter representative of a number of devices connected to an antenna is in other words a parameter that makes it possible to evaluate a saturation of an antenna, which in a known manner affects the signal and/or service quality.

The indicator of a meteorological condition affecting the propagation of a radiofrequency signal through the air may, for example, be a humidity level. The humidity level may be estimated from measurements of a humidity level for example. Specifically, when a recent measurement is available close to the predetermined position and it may be assumed that it will vary little between the moment when the measurement was taken and the predetermined moment in question, this measurement may be used to estimate the humidity level at the predetermined moment and at the predetermined position. It is also possible to obtain an indication relating to a meteorological condition such as rain by detecting, on board vehicles, whether the windshield wipers are on in an area close to the predetermined position and if it is again assumed that this meteorological condition will vary little. It is also possible to estimate an indicator of a meteorological condition from a weather forecast site such as temperature, degree of sunshine, risk of rain and snow, or wind speed for example. The humidity level itself may be retrieved from the weather forecast site.

The parameter representative of a number of devices connected to an antenna may be estimated from a measurement of a number of devices physically connected to an antenna at a given moment. If the time interval between the measurement and the estimate as desired is too large, it is possible to train a prediction model via supervised learning to predict the number of devices connected to an antenna at a given moment, for example at a given time of day, for a given day of the week, for example, and to estimate the number of devices connected at a given moment using the prediction model.

The parameter representative of a number of devices connected to an antenna may be estimated indirectly by consulting a server or a specialized site that makes it possible to retrieve a measurement or an estimate of a density of devices present in an area close to a given position at a given moment. Such data may be provided from positions of devices collected by dedicated mobile applications which provide information regarding traffic conditions for example.

Step S200 comprises a sub-step S210 of applying at least one prediction model configured to predict at least one parameter representative of a signal quality and/or service quality, on the basis of at least one estimated parameter of decrease in the signal and/or service quality estimated in step S110, and of an indication of a moment and of a position of the device for which the prediction must be carried out, the prediction model having been trained beforehand via supervised learning on a training database, the training database comprising, for a plurality of devices:
  at least one parameter representative of a signal quality and/or of a service quality when the device is connected to a radiofrequency antenna,
  an indicator of the position of the device,
  an indicator of a moment of connection of the device to the antenna,
  at least one parameter of decrease in the signal and/or service quality.

The indication of a moment and of a position of the device for which the prediction has to be implemented may be different, depending on the prediction model used. Regarding the indication of a time, it may be, for example, in one embodiment, a date and a time, that is to say a time of day, as determined in step S100 and, in another embodiment, a day of the week and a time of day. Regarding the indication of a position, it may be, in one embodiment, a GNSS position of the device determined in step S100 and, in another embodiment, a relative position of the device in relation to an antenna, for example an angle and a distance between the device and the antenna.

In one embodiment, a single prediction model is used to predict one or more parameters of a service quality and/or of a signal quality according to at least one parameter of decrease in the signal and/or service quality estimated in step S110, an indication of a moment and of a position of the device for which the prediction has to be implemented.

In another embodiment, step S200 further comprises a step S205, prior to step S210, of selecting at least one prediction model from among a plurality of prediction models, each prediction model having been trained beforehand via supervised learning using a training database comprising data relating to the devices that are connected to a respective antenna. In this case, the indication of a relative position of the device in relation to the respective antenna may be used. Advantageously, this may be an angle and a distance between the device and the respective antenna.

Said at least one prediction model configured to predict at least one parameter representative of a signal quality and/or of a service quality may be loaded beforehand into a memory of the computer implementing the prediction method or determined by this computer by implementing the training method described with reference to FIG. 2.

FIG. 2 shows the method for training said at least one model for predicting at least one parameter representative of a service quality and/or signal quality liable to be delivered by an antenna.

The training method comprises a step S010 of establishing a training database and a step S020 of training at least one prediction model via supervised learning of at least one parameter representative of a signal quality and/or of a service quality, from a training database.

The step S010 of establishing a training database comprises a sub-step S011 of receiving data collected by a plurality of devices, the collected data comprising, for each device:
  the measurement of at least one parameter representative of a signal quality and/or of a service quality when the device is connected to a radiofrequency antenna,
  the GNSS position of the device when the device is connected to the antenna,
  the date and time of connection to the antenna.

As indicated above for step S200, the position of the device may be a relative position of the device in relation to the antenna, for example an angle and a distance between the device and the antenna, which may be obtained from the absolute GNSS coordinates of the device. This embodiment makes it possible to simplify the training of the neural network. Alternatively, the neural network may also be trained using absolute GNSS coordinates.

The date and time of connection to the antenna, for each device, are relevant information for the model because they allow the model to detect variations in signal and/or service quality which may be cyclical, depending on the time of day, or the day of the week. For example, the rate of use of urban cells is higher at certain times of day (during the day rather than at night), or on certain days (for example working days). In addition, certain particular days of the year, such as, for example, days of national or religious holidays or particular events, for example sporting events, may be days with a very heavy demand on the network which may interfere with the quality of the signal and/or of the service.

Step S010 also comprises a sub-step S012 of estimating, for each device connected to an antenna at a given date and at a given time of connection, at least one parameter of decrease in the signal and/or service quality as described above with reference to FIG. 1. In particular, taking account of a meteorological condition affecting the propagation of a radiofrequency signal is advantageous for the establishment of the model because meteorological conditions, and in particular the level of humidity in the air, have a significant effect on wave propagation and may therefore decrease the quality of the signal and/or of the service. Taking account of a number of devices connected to an antenna is also an advantageous parameter since it provides an indication of the concurrent number of connections to an antenna, and therefore of the possible saturation of the antenna, which may also considerably decrease the quality of the signal and/or of the service.

Step S010 also comprises a sub-step S013 of creating at least one training database on the basis of at least some of the collected data and of at least some of the parameters of decrease in the signal and/or service quality associated therewith.

In step S020, at least one prediction model via supervised learning is trained from a training database to predict at least one parameter representative of a signal quality and/or a service quality. Advantageously, the training of a prediction model via supervised learning is done by training a neural network.

In one embodiment, a plurality of training databases are created in step S012 and a plurality of prediction models via supervised learning are trained from a respective training database.

In one embodiment, the data collected in sub-step S011 further comprise an identifier of the antenna to which a device has been connected at a given date and time of connection. This identifier is used in sub-step S012 of creating at least one training database to create a plurality of training databases, each training database comprising data relating to the devices that are connected to one and the same antenna having a predetermined identifier and parameters of decrease in the signal and/or service quality at the time and at the date of connection of the device in question to the antenna. Next, in step S020, a plurality of prediction models is trained, each prediction model making it possible to predict at least one parameter representative of a signal and/or service quality for one of the antennas in question.

The use of a plurality of prediction models, each prediction model being configured to predict at least one parameter representative of a signal quality and/or service quality for a given antenna, has advantages since it is easy to update the prediction method by adding an additional prediction model for the new antenna. It is then just a matter of creating a new training database comprising data relating to the devices that are connected to the new antenna and parameters of decrease in the signal and/or service quality at the time and at the date of connection of the device in question to the new antenna.

If only one prediction model is used, a new training database would have to be created comprising the previously used database and the data relating to the new antenna and the parameters of decrease in the signal and/or service quality associated therewith and training step S020 would have to be re-implemented on the basis of this new training database.

It should be noted that the one or more training databases created in sub-step S013 comprise, for a plurality of devices:
- at least one parameter representative of a signal quality and/or of a service quality when the device is connected to a radiofrequency antenna,
- an indicator of the position of the device,
- an indicator of a moment of connection of the device to the antenna,
- at least one parameter of decrease in the signal and/or service quality.

The indicator of the position of the device may correspond to the GNSS position of the device when it is connected to a radiofrequency antenna at a given date and time of connection or to the relative position of this device in relation to the antenna to which it is connected.

In this case, the training method also comprises a preliminary step S005 of receiving a database comprising identifiers of radiofrequency antenna cells and GNSS positions of said cells and sub-step S013 of creating at least one database comprises computing the relative position of the device in question in relation to the antenna to which it is connected from the GNSS position of the selected device and from the GNSS position of the antenna to which it is connected.

The use of the relative distance of a device in relation to the antenna to which it is connected is particularly advantageous in the case described above in which one prediction model is trained per antenna. The training of the prediction model is then faster and more reliable.

Regarding the indicator of a moment of connection of the device to the antenna, it may be the date and time, that is to say the time of day, of connection but also a day of the week and the time of day of connection for example. Specifically, it is easier to predict conditions relating to traffic or to the presence of people in a predetermined area according to the day of the week and the time of day in question.

In one embodiment, the training method is implemented by the same computer as that implementing the prediction method. In this case, steps S010 are carried out prior to step S100. In another embodiment, the training method is implemented by another computer and then transmitted to the computer implementing the prediction method.

FIG. 3 illustrates a system 100 comprising a remote server 200 capable of being connected to a plurality of devices connected to a plurality of radiofrequency antennas for different positions thereof. In the example illustrated here, these are vehicles 100 moving on a road network (not shown). Both the remote server 200 and the vehicles 110 comprise at least one communication interface, a memory and a computer. The computer of the remote server is configured to implement the method for training at least one prediction model described with reference to FIG. 2 on the basis in particular of data collected by each of the vehicles. The memory of the remote server therefore comprises code instructions for implementing the prediction method.

As described above, the remote server 200 may also, optionally, be configured to connect to other remote servers 120, 130. For example, the remote server 120 may be a server configured to provide weather forecasts and therefore transmit one or more indications relating to a meteorological condition for a given moment and a given position. The remote server 130 may be a server configured to provide information regarding traffic conditions for example.

In one embodiment, the same remote server 200 may be used to implement the method for predicting at least one parameter representative of a signal and/or service quality described with reference to FIG. 1. The memory of the remote server then comprises code instructions for implementing the prediction method and the computer is configured to predict at least one parameter representative of a signal and/or service quality that can be obtained by a device when it is connected to one radiofrequency antenna from among a plurality of antennas that are configured to establish a connection with said device.

In this case, the computer of the remote server is configured to implement the following steps:
  estimating at least one parameter of decrease in the signal and/or service quality,
  predicting at least one parameter representative of a signal and/or service quality using at least one prediction model configured to predict at least one parameter representative of a signal quality and/or service quality, on the basis of an estimated parameter of decrease in the signal and/or service quality, and of an indication of a moment and of a position of the device for which the prediction must be carried out, the prediction model via supervised learning having been trained beforehand via supervised learning on a training database, the training database comprising, for a plurality of devices:
  at least one parameter representative of a signal quality and/or of a service quality when the device is connected to a radiofrequency antenna,
  an indicator of the position of the device,
  an indicator of a moment of connection of the device to the antenna,
  at least one parameter of decrease in the signal and/or service quality.

In another embodiment, the prediction model may be loaded into a memory of another server and the computer of this server is configured in the same way. This is particularly advantageous when the devices for which the data are collected are, for example, cellular telephones. The prediction of a signal and/or service quality may then be consulted via a remote site for tasks of planning access to the network comprising the antennas.

The invention claimed is:

1. A method for predicting at least one parameter representative of a signal quality and/or service quality liable to be delivered to a device when it is connected to one radiofrequency antenna among a plurality of antennas that are configured to establish a connection with said device, the method being implemented by a computer, the method comprising:
  a step of obtaining at least one parameter of decrease in the signal and/or service quality,
  a step of predicting at least one parameter representative of a signal and/or service quality by applying at least one prediction model configured to predict at least one parameter representative of a signal quality and/or service quality, on the basis of an estimated parameter of decrease in the signal and/or service quality, and of an indication of a moment and of a position of the device for which the prediction must be carried out, the prediction model having been trained beforehand via supervised learning on a training database, the training database comprising, for a plurality of devices:
    at least one parameter representative of a signal quality and/or of a service quality when the device is connected to a radiofrequency antenna,
    an indicator of the position of the device,
    an indicator of a moment of connection of the device to the antenna,
    at least one parameter of decrease in the signal and/or service quality, the method being characterized in that:
  the prediction step comprises selecting at least one prediction model from among a plurality of prediction models, each prediction model having been trained beforehand via supervised learning using a training database comprising data relating to the devices that are connected to a respective antenna, and
  the indicator of the position of the device is a relative position of the device in relation to a respective antenna, the selected prediction model corresponding to the prediction model trained using a training database comprising the relative position of the device in relation to the respective antenna.

2. The prediction method as claimed in claim 1, wherein the parameter of decrease in signal and/or service quality is an indicator of a meteorological condition affecting the propagation of a radiofrequency signal through the air or a parameter representative of the number of devices connected to an antenna.

3. The prediction method as claimed in claim 2, wherein the parameter representative of the number of devices connected to the antenna is a measured or predicted number of devices connected to the antenna.

4. The method for predicting at least one parameter representative of a signal and/or service quality as claimed in claim 1, wherein the relative position of the device comprises an angle and a distance between the device and the respective antenna.

5. The method as claimed in claim 1, further comprising the prior implementation of training at least one model for predicting at least one parameter representative of a service quality and/or signal quality liable to be delivered by a radiofrequency antenna, comprising:
  a step of establishing a training database comprising:
    a sub-step of receiving data collected by a plurality of devices, the collected data comprising, for each device:
      the measurement of at least one parameter representative of a signal quality and/or of a service quality when the device is connected to a radiofrequency antenna,
      the GNSS position of the device when the device is connected to the antenna,
      the date and time of connection to the antenna,
    a sub-step of estimating, for each device connected to an antenna at a given date and at a given time of connection at least one parameter of decrease in the signal and/or service quality,
    a sub-step of creating at least one training database on the basis of at least some of the collected data and of at least some of the parameters of decrease in the signal and/or service quality associated therewith, and a step training at least one prediction model via supervised learning of at least one parameter representative of a signal quality and/or of a service quality, from a training database.

6. The method as claimed in claim 5, wherein:
the collected data further comprise an identifier of the antenna to which a device has been connected at a given date and time of connection,
the step of establishing a training database comprises the creation of a plurality of training databases, each training database comprising data relating to the devices connected to a respective antenna having a respective identifier and parameters of decrease in the signal and/or service quality associated therewith,
the training step comprises training a prediction model via supervised learning of at least one parameter representative of a signal quality and/or of a service quality on each training database of the plurality of training databases.

7. The method as claimed in claim 6, wherein each training database comprises a relative position of each device in relation to the respective antenna at the date and time of connection to the respective antenna.

8. The method as claimed in claim 7, wherein the relative position of the device in relation to the respective antenna comprises a distance and an angle between the device and the respective antenna.

9. A method for predicting a signal and/or service quality that can be obtained on a predetermined route of a vehicle on a road network by one radiofrequency antenna among a plurality of antennas that are configured to establish a connection with said device, the method being implemented by a computer, the method comprising:
estimating a time and date at which the vehicle should reach a predetermined position on the route
predicting at least one parameter representative of a signal and/or service quality by implementing a prediction method at the determined time and date, at the predetermined position on the route, method comprising:
a step of obtaining at least one parameter of decrease in the signal and/or service quality,
a step of predicting at least one parameter representative of a signal and/or service quality by applying at least one prediction model configured to predict at least one parameter representative of a signal quality and/or service quality, on the basis of an estimated parameter of decrease in the signal and/or service quality, and of an indication of a moment and of a position of the device for which the prediction must be carried out, the prediction model having been trained beforehand via supervised learning on a training database, the training database comprising, for a plurality of devices:
at least one parameter representative of a signal quality and/or of a service quality when the device is connected to a radiofrequency antenna,
an indicator of the position of the device,
an indicator of a moment of connection of the device to the antenna,
at least one parameter of decrease in the signal and/or service quality,
the method being characterized in that;
the prediction step comprises selecting at least one prediction model from among a plurality of prediction models, each prediction model having been trained beforehand via supervised learning using a training database comprising data relating to the devices that are connected to a respective antenna, and
the indicator of the position of the device is a relative position of the device in relation to a respective antenna, the selected prediction model corresponding to the prediction model trained using a training database comprising the relative positon of the device in relation to the respective antenna.

10. A computer configured to implement method for predicting at least one parameter representative of a signal quality and/or service quality liable to be delivered to a device when it is connected to one radiofrequency antenna among a plurality of antennas that are configured to establish a connection with said device, the method being implemented by a computer, the method comprising:
a step of obtaining at least one parameter of decrease in the signal and/or service quality,
a step of predicting at least one parameter representative of a signal and/or service quality by applying at least one prediction model configured to predict at least one parameter representative of a signal quality and/or service quality, on the basis of an estimated parameter of decrease in the signal and/or service quality, and of an indication of a moment and of a position of the device for which the prediction must be carried out, the prediction model having been trained beforehand via supervised learning on a training database, the training database comprising, for a plurality of devices;
at least one parameter representative of a signal quality and/or of a service quality when the device is connected to a radiofrequency antenna,
an indicator of the position of the device,
an indicator of a moment of connection of the device to the antenna,
at least one parameter of decrease in the signal and/or service quality, the method being characterized in that;
the prediction step comprises selecting at least one prediction model from among a plurality of prediction models, each prediction model having been trained beforehand via supervised learning using a training database comprising data relating to the devices that are connected to a respective antenna, and
the indicator of the position of the device is a relative position of the device in relation to a respective antenna, the selected prediction model corresponding to the prediction model trained using a training database comprising the relative position of the device in relation to the respective antenna.

* * * * *